L. M. MACOMB.
BRAKE SHOE CLAMP.
APPLICATION FILED FEB. 16, 1916.

1,214,342. Patented Jan. 30, 1917.

Witnesses
J H Crawford
P. M. Smith

Inventor
L.M. Macomb,
By Victor J. Evans
Attorney

UNITED STATES PATENT OFFICE.

LESTER M. MACOMB, OF PAYETTE, IDAHO.

BRAKE-SHOE CLAMP.

1,214,342.  Specification of Letters Patent.  Patented Jan. 30, 1917.

Application filed February 16, 1916. Serial No. 78,740.

*To all whom it may concern:*

Be it known that I, LESTER M. MACOMB, a citizen of the United States, residing at Payette, in the county of Canyon and State of Idaho, have invented new and useful Improvements in Brake-Shoe Clamps, of which the following is a specification.

This invention relates to brake shoe clamps for use on all kinds of vehicles employing brake beams, the object of the invention being to produce novel and reliable clamping means for securely holding and fastening a brake shoe or block to a brake beam, the clamping means admitting of the brake shoe being readily and quickly clamped and released and being adjustable for the purpose of receiving and securely holding shoes or blocks of different sizes provided either with rounded or squared edges.

With the above and other objects in view, the invention consists in the novel construction, combination and arrangement of parts, as herein described, illustrated and claimed.

Figure 1:
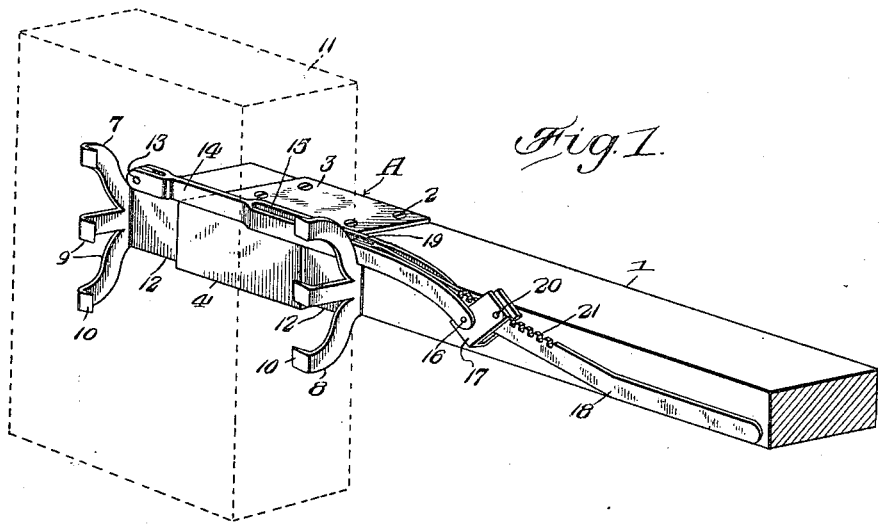
Figure 2:
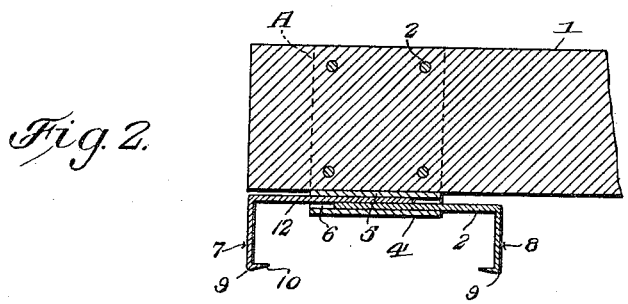
Figure 3:
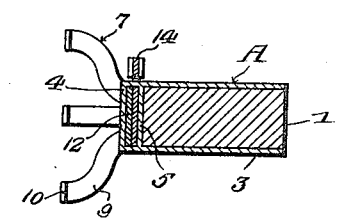

In the accompanying drawings:—Figure 1 is a perspective view showing the clamp of this invention mounted upon a brake beam and showing a brake shoe in dotted lines. Fig. 2 is a fragmentary horizontal section illustrating the relation of the tongues of the clamping members to the keeper. Fig. 3 is a vertical section through the keeper extending transversely of the brake beam.

1 designates a brake beam to which is secured by means of bolts 2 a keeper designated generally at A and comprising two substantially parallel and relatively spaced plate-like members 3 projecting on one side of the brake beam and united by a connecting portion 4 and also provided at a distance from the portion 4 with a cross web 5 thereby leaving a tongue receiving slot 6 the purpose of which will appear.

7 and 8 designate two clamps or clamping members each shown as comprising a plurality of arms or fingers 9 having inwardly turned extremities or teeth 10 adapted to embed themselves in the opposite edges of a brake shoe or block indicated at 11. Each of said clamping members is provided with a tongue 12 and these tongues are inserted in the tongue receiving slot 6 in overlapping relation to each other.

Connected to one of the clamping members by means of a pivot 13 is a lever 14 which for the greater part of its length is bifurcated as shown at 15 and has pivotally mounted between the extremities of its arms at the point 16 a link 17 through which is inserted another lever 18 pivotally connected at 19 to the other clamping member. The lever 18 is slidable through said link between the pivot 16 and a pin 20 inserted through the sides of the link 17 which link is of U shape to adapt it to receive the lever 18 and admit of the relative sliding movement between said link and the lever 18.

From the foregoing description, taken in connection with the accompanying drawings, it will now be understood that when the lever 18 is moved in one direction, the clamping members are moved away from each other so as to release a brake shoe or block and when said lever is moved in the opposite direction, the clamping members are moved toward each other to clamp said shoe or block.

When the shoe is firmly clamped in position, the ratchet teeth 21 on the lever 18 engage the pin 20 of the link 17 thereby holding both levers in a relatively fixed position. By having a number of teeth 21, the link 17 forming one of the ratchet members may be adjusted lengthwise of the lever 18 to provide for a greater or less distance between the clamping members for the purpose of accommodating brake shoes or blocks of different sizes. By the simple means described, a brake shoe or block that is too far worn for further use may be quickly replaced by a new one.

What I claim is:—

The combination with a brake beam, of a clamp holding keeper fastened to said beam and provided with a tongue slot, opposed brake shoe clamps provided with oppositely facing tongues which overlap in said slot, clamp-tightening and releasing levers pivotally attached to said clamps, and ratchet elements on said levers for holding the latter relatively fixed when the shoe is held between the clamps.

In testimony whereof I affix my signature in presence of two witnesses.

LESTER M. MACOMB.

Witnesses:
JAMES APPLEGATE,
F. H. LYON.